United States Patent [19]

Saito et al.

[11] 4,400,808

[45] Aug. 23, 1983

[54] ROTARY RECORDING MEDIUM REPRODUCING APPARATUS

[75] Inventors: Takashi Saito, Ayase; Toshio Hirano, Atsugi; Takashi Kumaki, Sagamihara, all of Japan

[73] Assignee: Victor Company of Japan, Ltd., Yokohama, Japan

[21] Appl. No.: 294,360

[22] Filed: Aug. 19, 1981

[30] Foreign Application Priority Data

Aug. 20, 1980 [JP] Japan .................................. 55-117737
Aug. 20, 1980 [JP] Japan .................................. 55-117739
Aug. 20, 1980 [JP] Japan .................................. 55-117741

[51] Int. Cl.³ .................... G11B 17/04; G11B 25/04
[52] U.S. Cl. ...................................... 369/262; 369/77; 369/270; 369/271
[58] Field of Search .................. 369/77, 219, 243, 249, 369/262, 263, 270, 271, 291, 292

[56] References Cited

U.S. PATENT DOCUMENTS 4,305,145 12/1981 Hughes et al. ....................... 369/270
4,326,284 4/1982 Elliot ...................................... 369/77

FOREIGN PATENT DOCUMENTS 2074777 11/1981 United Kingdom ................. 369/270
2075741 11/1981 United Kingdom ................. 369/270
2083268 3/1982 United Kingdom ................. 369/77

Primary Examiner—Steven L. Stephan
Attorney, Agent, or Firm—Louis Bernat

[57] ABSTRACT

A rotary recording medium reproducing apparatus reproduces a rotary recording medium accommodated within a case, where the case comprises a jacket provided with a space for accommodating the rotary recording medium and an opening for allowing the rotary recording medium to go in and out of the jacket, and a lid member inserted through the opening of the jacket for closing the opening of the jacket. The rotary recording medium reproducing apparatus comprises an inserting opening through which the case is inserted, a turntable for rotating the rotary recording medium, a lid member locking mechanism and rotary recording medium clamping mechanism respectively provided at an innermost part of the reproducing apparatus opposite to the inserting opening with respect to the turntable, a jacket opening enlarging mechanism provided in the vicinity of the inserting opening, capable of moving over the turntable between a position in the vicinity of the inserting opening and the innermost part of the reproducing apparatus, in response to an operation in which the case is inserted into and pulled out from the reproducing apparatus, an elevator mechanism for raising and lowering a rotary recording medium supporting member for supporting the rotary recording medium, independently from the turntable, an elevator motor for operating the elevator mechanism, when the elevator motor operates so that the support member is at a raised position due to the operation of the elevator mechanism upon insertion of the case into the reproducing apparatus, and an elevator lever member provided respective of the elevator mechanism, for operating the elevator mechanism by operating independently from the elevator motor. The elevator lever member is positioned within a moving passage of a locking guiding part which is a part of the jacket opening enlarging means. Further, the elevator lever member is locked and guided by the locking guiding part and displaced towards a direction so as to operate the elevator means to lower the supporting member so that the supporting member retreats from a case inserting path upon insertion of the case into the reproducing apparatus, and is released of the locking operation by the locking guiding part and displaced towards an opposite direction so as to operate the elevator means to raise the supporting member upon extraction of the case from the reproducing apparatus.

6 Claims, 9 Drawing Figures

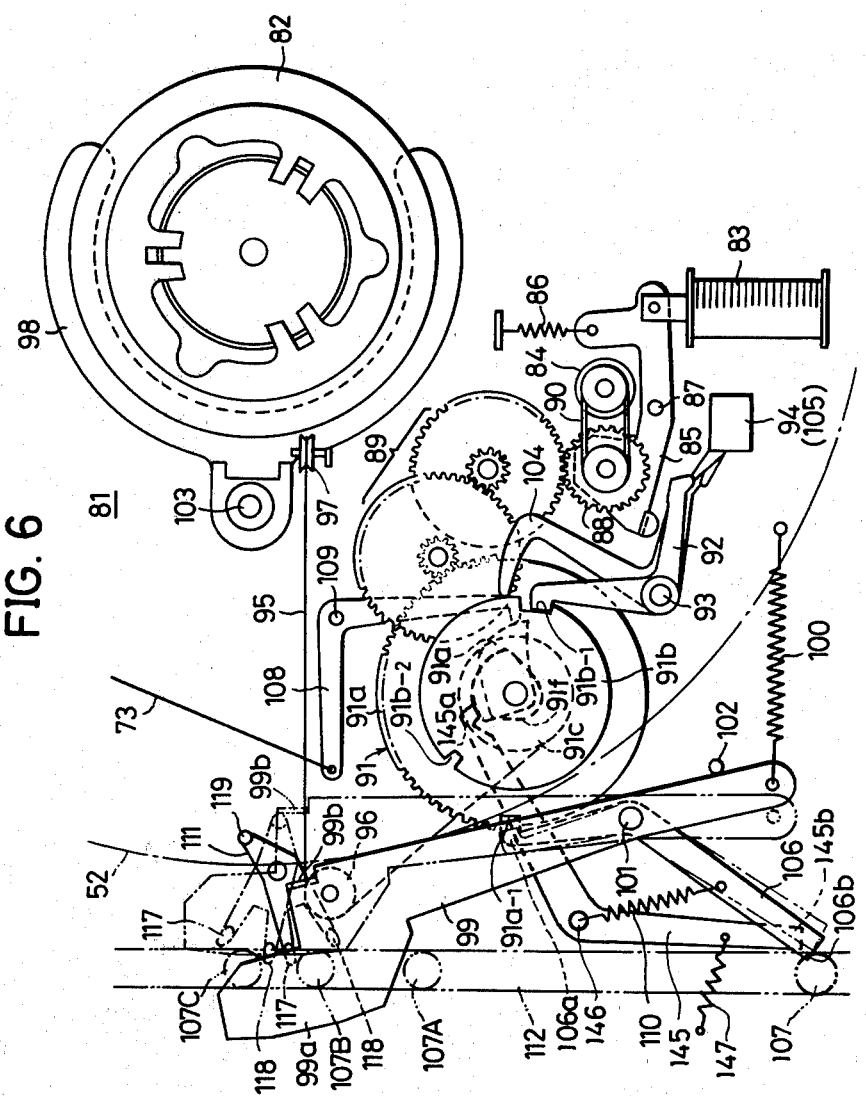

ROTARY RECORDING MEDIUM REPRODUCING APPARATUS

BACKGROUND OF THE INVENTION

The present invention relates to rotary recording medium reproducing apparatuses capable of placing and leaving a rotary recording medium in a state possible for reproduction within the rotary recording medium reproducing apparatus when a jacket (disc case) having a lid for accommodating the rotary recording medium therein is inserted into and then pulled out from within the rotary recording medium reproducing apparatus, and also capable of incasing the rotary recording medium within the jacket so that the rotary recording medium can be obtained outside the rotary recording medium reproducing apparatus together with the jacket, when the empty jacket is inserted into and then pulled out from within the reproducing apparatus. The present invention further and especially relates to the above type of a rotary recording medium reproducing apparatus in which a disc lifter elevator mechanism is provided, for lowering a disc lifter so as to retreat from an insertion passage of the jacket in response to the above insertion of the jacket into the rotary recording medium reproducing apparatus, without driving a motor.

Conventionally, in an apparatus for reproducing a disc-shaped recording medium (referring to video disc, PCM audio disc, and the like, and hereinafter simply referred to as a disc), there are types of apparatuses in which a disc is reproduced when the disc is loaded upon holding and placing of the disc within the reproducing apparatus, by inserting into and then pulling out a disc case which has a lid and accommodates a disc therein, from within the reproducing apparatus.

As a conventional apparatus of this type, a reproducing apparatus was proposed in a United States patent application Ser. No. 231,868 filed Feb. 5, 1981, entitled "DISC-SHAPED RECORDING MEDIUM REPRODUCING APPARATUS" in which the assignee is the same as that of the present application. This previously proposed reproducing apparatus operates together with a disc case comprising a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, holding means for holding a least one of the disc and the lid member provided at an innermost part on the opposite side from the inserting opening with respect to the turntable, lowering and raising means for lowering the disc to a position where the disc is placed on the turntable from a holding position where the disc is held by the holding means upon starting of the reproduction and raising the disc to the holding position from the turntable upon finishing or discontinuing of the reproduction, a reproducing transducer for reproducing and disc placed on the turntable, and moving means for moving the reproducing transducer from a waiting position to a reproducing position with respect to the disc.

In the above previously proposed reproducing apparatus, the disc is raised and lowered by a disc lifter. When the disc is lowered, the outer peripheral part and the inner peripheral part of the disc are supported, and the disc is stably placed onto the turntable. However, when the disc is raised, only the inner peripheral part of the disc is supported by the disc lifter. Accordingly, the state in which the disc is supported is unstable, since the outer peripheral part of the disc is not supported. If the disc is left in the above state for a long period of time, the disc may become deformed. Therefore, it is desirable to construct the reproducing apparatus so that the state in which the disc lifter is lowered is the fundamental state, and the disc lifter is raised every time the disc case or the jacket is inserted into the reproducing apparatus, by performing a predetermined operation to drive an elevator motor for raising the disc lifter.

Furthermore, in the above reproducing apparatus, the disc lifter is lowered and raised every time the disc is loaded and unloaded. When loading the disc, for example, the disc lifter is lowered upon insertion of the disc case to temporarily retreat from the disc case insertion passage. Hence, when only the jacket is pulled out, the disc lifter is raised again. The raising and lowering operation of the disc lifter must be performed with a matched timing with the insertion of the disc case into the reproducing apparatus. However, in reality, it is difficult to perform the above operation with the appropriate timing by use of a motor provided for raising and lowering the disc lifter. Therefore, a disc lifter elevator mechanism must be provided, which is capable of operating independently from the above motor for raising and lowering the disc lifter.

SUMMARY OF THE INVENTION

Accordingly, it is a general object of the present invention to provide a novel and useful rotary recording medium reproducing apparatus in which the above described demands have been satisfied.

Another and more specific object of the present invention is to provide a rotary recording medium reproducing apparatus provided with a disc lifter elevator mechanism capable of lowering and raising a disc lifter upon insertion and extraction of a disc case, without using a motor for raising the disc lifter upon insertion of the disc case. According to the apparatus of the present invention, an operation in which the disc lifter retreats from the disc case insertion passage upon insertion of the disc case is performed with a predetermined timing respective of the insertion of the disc case, and a control system for the motor for raising and lowering the disc lifter can be simplified.

Other objects and further features of the present invention will be apparent from the following detailed description when read in conjunction with the accompanying drawings.

BRIEF DESCRIPTION OF THE DRAWINGS

FIG. 3 is a schematic elevation, in vertical section, of the apparatus of FIG. 2;

FIGS. 4, 5 and 6 are plan views respectively showing one embodiment of a disc lifter elevator mechanism shown in FIG. 2, in a state before insertion of the disc case, in a state when a loading-eject button is operated upon inserting the disc case, and in a state where the disc lifter has elevated so as to allow insertion of the disc case;

DETAILED DESCRIPTION

Figure 1:
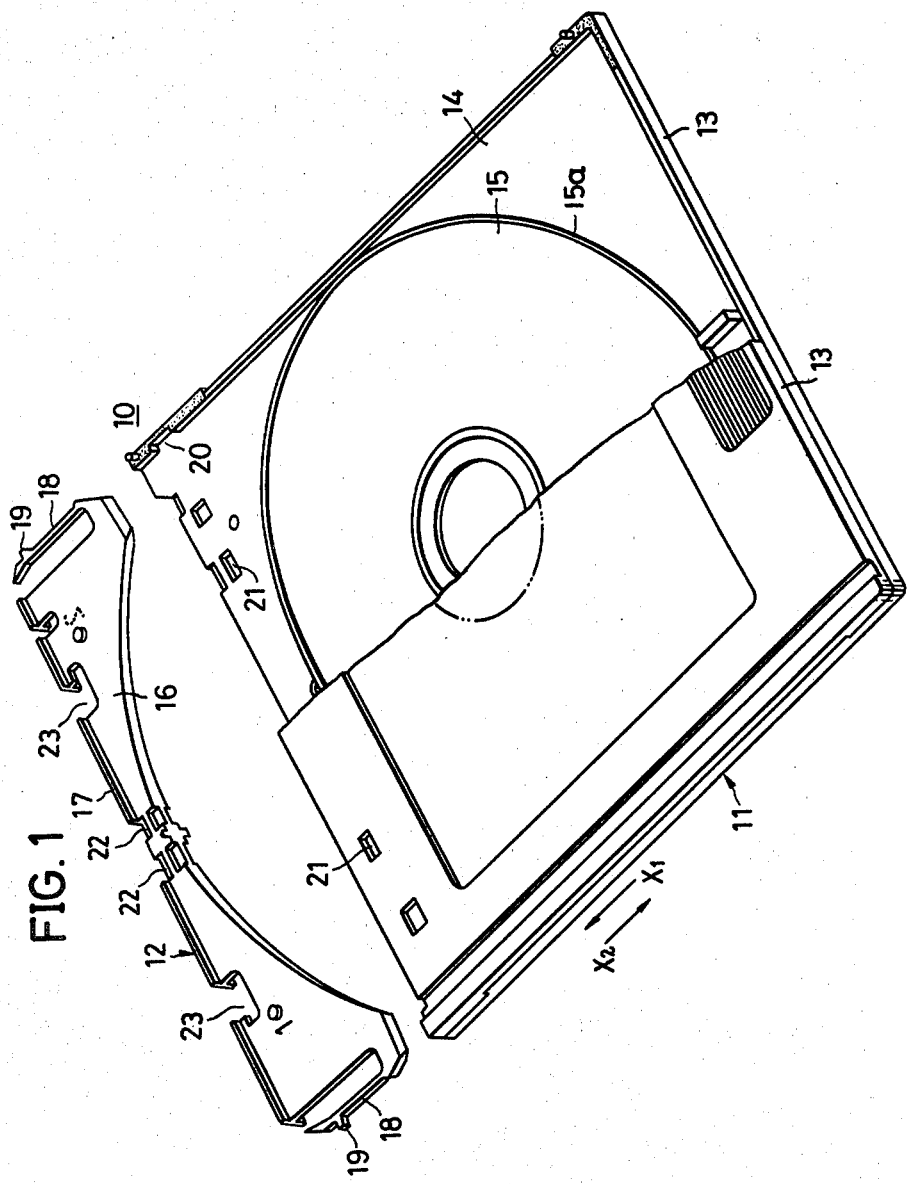
FIG. 1 is a perspective view showing an example of a disc case which operates together with a disc reproducing apparatus according to the present invention, with a part cut away and disassembled.

FIG. 1 shows an example of a disc case which operates together with a disc reproducing apparatus of the present invention. A disc case 10 comprises a jacket 11 and a lid plate 12. The jacket 11 is assembled from a pair of jacket halves 13 and 13, and comprises a flat cavity or space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
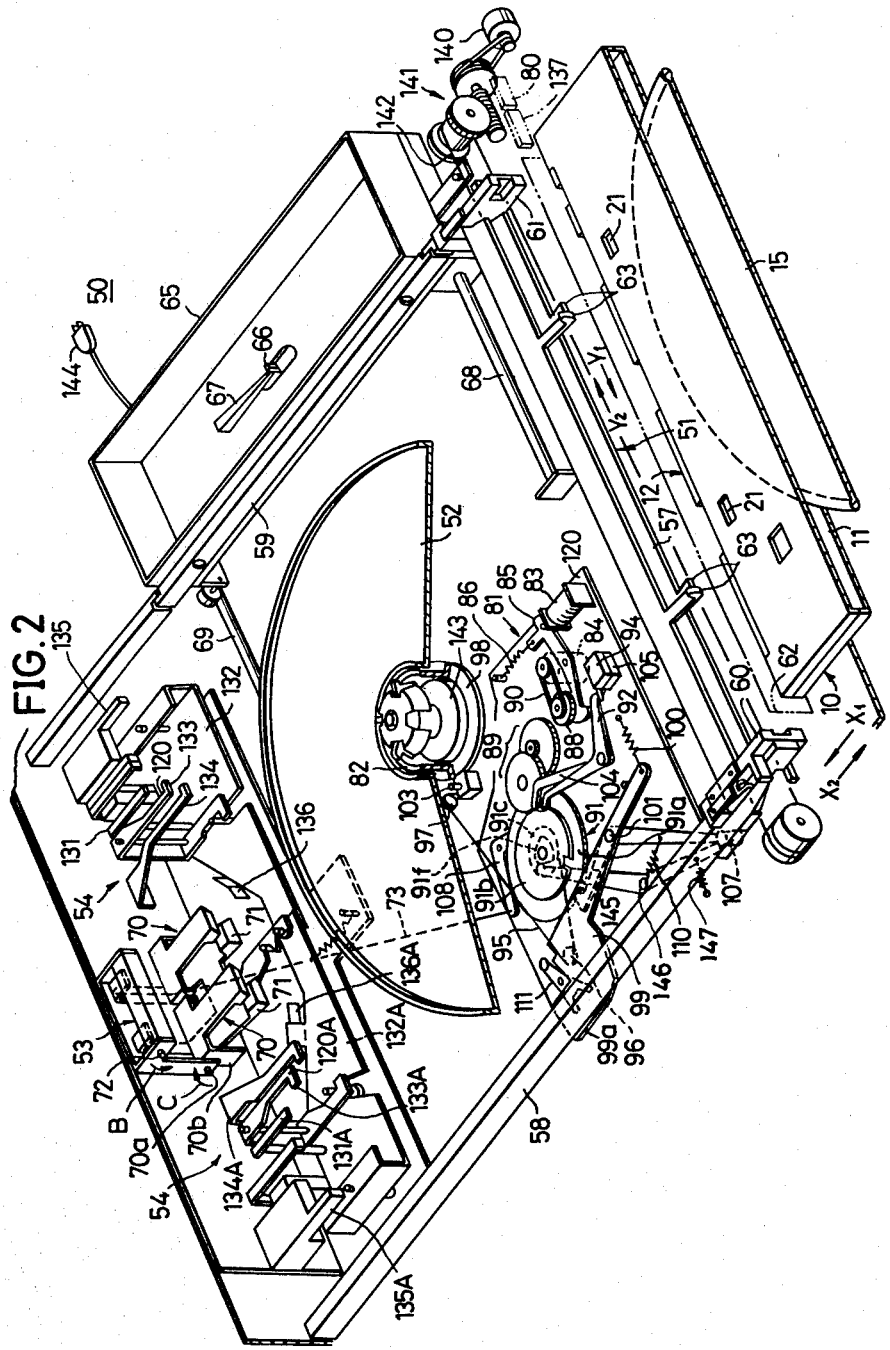
FIG. 2 is a perspective view showing the inner construction of a disc reproducing apparatus according to the present invention, with a part cut away.

A reproducing apparatus 50, shown in FIG. 2, is designed so that its basic state is that the disc lifter was descended to its final position, and for every insertion of the disc case, a loading-eject button is pushed to operate an elevator motor thereby to move the disc lifter upwards.

The reproducing apparatus 50 substantially comprises a jacket opening enlarging mechanism 51, a turntable 52 to rotate the disc 15 positioned thereon, a disc holding mechanism 53 for clamping the disc 15, a lid plate locking mechanism 54 for locking the lid plate 12, and the like.

The jacket opening enlarging mechanism 51 comprises upper and lower beams 56 and 57 extending in the directions of arrows Y1 and Y2, and sliders 60 and 61 which are respectively fixedly inserted into guide rails 58 and 59, to support both ends of the respective beams 56 and 57 and to move along the guide rails 58 and 59. The jacket opening enlarging mechanism 51 is guided by guide rails 58 and 59, and moves between the innermost part of the reproducing apparatus 50 and a disc case inserting opening 62 provided at the frame of the reproducing apparatus 50, in the direction of arrows X1 and X2.

Enlarging fingers 63 are respectively formed on each of the beams 56 and 57, directed towards the inserting opening 62. When each of the beams 56 and 57 are positioned on the side of the inserting opening 62, the enlarging fingers 63 mutually cose upon each other, and when the beams 56 and 57 move in the direction of the arrow X1, the enlarging fingers 63 rotate in upward and downward directions so as to mutually separate from each other.

A pickup frame 65 is provided with a reproducing stylus 66 and a cantilever 67, and moves in the directions of the arrows Y1 and Y2 along a pair of guide rods 68 and 69.

The disc holding mechanism 53 and the lid plate locking mechanism 54 and constructed symmetrically on the left and right sides with respect to a line which passes through the center of the turntable in the direction of the arrow X1. The parts on the left side are designated by the same reference numerals as the corresponding parts on the right side, with a subscript "A", and their description will be omitted.

The disc holding mechanism 53 is provided at the inner part of the reproducing apparatus 50 on the opposite side of the inserting opening 62, and comprises a pair of upper and lower holding fingers 70 and 71. The lower holding finger 71 is axially supported on an upper pin 72. A wire 73 is linked to the holding finger 71, and the holding finger 71 receives a rotational force in the direction of arrow B due to the force of a spring 74. Accordingly, the holding finger 71 receives a force urging rotation in the upward direction. The upper holding finger 70 is axially supported by a pin 70a.

Upon reproduction of the disc 15, the disc case 10 is inserted through the inserting opening 62 of the reproducing apparatus 50, by inserting the disc case 10 with the side of the lid plate 12 into the direction of the arrow X1.

Upon insertion of the disc case 10, a load-eject button 80 is pushed. Responsive to this operation, a disc lifter elevator mechanism 81 changes from a state indicated in FIGS. 2 and 4, by way of a state indicated in FIG. 5, to a final state indicated in FIG. 6. In the beginning, a disc lifter 82 (disc supporting member) is at a lowered position, that is, at a position of capable of reproducing the disc, as shown in FIGS. 2 and 3. When the button 80 is pushed, a plunger 83 is energized, and an elevator motor 84 starts to rotate. When the plunger 83 is energized, a rotatable lever 85 rotates clockwise about a pin 87 against a force exerted by a spring 86, and hence, a gear 88 supported on the lever 85 meshes with reduction gears 89. This gear 88 is rotated clockwise by the elevator motor 84 by way of a belt 90. The rotation of the gear 88 is transmitted by way of the reduction gears 89 to a gear part 91a of a cam-gear structure 91, which thereby rotates counterclockwise at a reduced speed.

When the cam-gear structure 91 rotates by an angle of approximately 140 degrees, a beak at the end of a first switch arm 92 enters into a first depression 91b-1 of a disc cam 91b, and this arm 92 rotates counterclockwise about a pin 93 thereby to render a first microswitch 94 to be turned OFF. By the turning OFF of this microswitch 94, the elevator motor 84 is cut off from the power source and stops rotating. This motor 84 thus stopped, then serves as a load against the reverse rotation of the cam-gear structure 91, which is thereby maintained to be stopped at the rotated position.

As the cam-gear structure 91 rotates, a wire 95 is taken up on a reel 91c. The tensioned wire 95 is guided by pulleys 96 and 97, and is linked to an U-shaped elevator plate 98 resting at a desended position thereof. The pulley 96 is provided on a lifter elevating lever 99, which forms an essential part of the present invention, is urged to rotate counterclockwise about a pin 101 by a spring 100, and is engaged with a stopper pin 102. This lifter elevating lever 99 is provided in a manner not related to the cam-gear structure 91, and rotates independently from the cam-gear structure 91. As the wire 95 is taken up on the reel 91c, the elevator plate 98 is pulled upwards and moves upwards along a guide post 103, and hence, the disc lifter 82 is pushed upwards to a position capable of supporting the disc 15 as indicated by two-dot chain line in FIG. 3.

A beak of a second switch arm 104 slips out from a second depression 91b-2 of the disc cam 91b. The arm 104 rotates clockwise to cause a second microswitch 105 to be turned ON. Now, the first microswitch 95 is in an OFF state and the second microswitch 105 is in an ON state. Hence, it is possible for a microcomputer to recognize that the disc lifter 82 is at the elevated disc supportable position.

The cam-gear structure 91 is then at the rotational position where a depression 91a-1 of the gear 91a confronts a beak 106a of a lifter lock lever 106. At this moment, the lifter lock lever 106 is engaged at an end 106b by a cylindrical pin member 107 projected downward from the slider 60 which is positioned at the front side of the apparatus 50, so that the beak 106a does not enter into the depression 91a-1. Furthermore, a cam 91d rotates an L-shaped clamp control arm 108 counterclockwise about a pin 109, and hence, the wire 73 is pulled to cause the holding fingers 70 and 71 to assume the state capable holding the disc.

When the reproducing apparatus 50 assumes the above described state, the disc case 10 is inserted into the apparatus 50. By this insertion of the disc case 10, the jacket opening enlarging mechanism 51 is pushed and moved in the direction of the arrow X1 by the disc case 10. When the enlarging mechanism 51 moves, the upper and lower beams 56 and 57 rotates, and the enlarging fingers 63 thus respectively move in directions so as to mutually separate from each other. Accordingly, the tip ends of the enlarging fingers 63 engage with engaging windows 21 of the jacket 11, and enlarge the front part of the upper and lower jacket halves 13 upwards and downwards, to enlarge the opening of the jacket 11.

Additionally, as the disc case 10 is inserted, the pin member 107 moves from a position indicated in FIG. 2 towards the direction of the arrow X1. When the pin member 107 moves from the original position, the lifter lock lever 106 is released from the engagement by the pin member 107 and hence rotates clockwise by a spring 110, whereby the beak 106a enters into the depression 91a-1 to lock the cam-gear structure 91 at this rotational position. The end part 106b of the lifter lock lever 106 enters within a path 112 of the pin member 107.

This pin member 107 moves along the moving path 112 as indicated by positions 107A→107B→107C in FIG. 6. When the pin member 107 moves, the pin member 107 makes contact with and pushes aside a cam part 99a of the lifter elevating lever 99, to rotate the cam part 99a clockwise against a force exerted by the spring 100, up to a position indicated by two-dot chain lines in FIG. 6. The lever 99 is then locked by a lock lever 111.

Accompanied by the rotation of the lever 99, the pulley 96 shifts to a position indicated by two-dot chain line in FIGS. 3 and 6. The pulley 96 guides the wire 95 stretched across between the elevator plate 98 and the cam-gear structure 91 at an intermediate position. Thus, slack is introduced in the wire 95, and both the disc lifter 82 and the elevator plate 98 accordingly move downwards due to their own weights, to retreat from the disc insertion passage. The elevator motor 84 remains stopped in this state, and the disc lifter retreating operation is accordingly performed without rotating the elevator motor 84 towards the reverse direction.

Figure 7A:
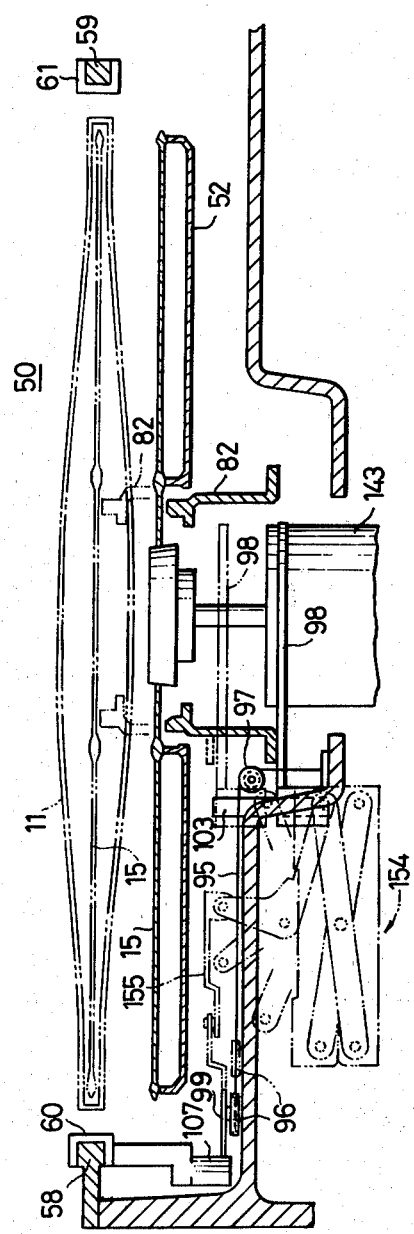
FIGS. 7A and 7B are plan views, on large scale, respectively showing a mechanism for locking a disc lifter elevating lever, in a state before locking and in a state after locking has been effected.
Figure 7B:
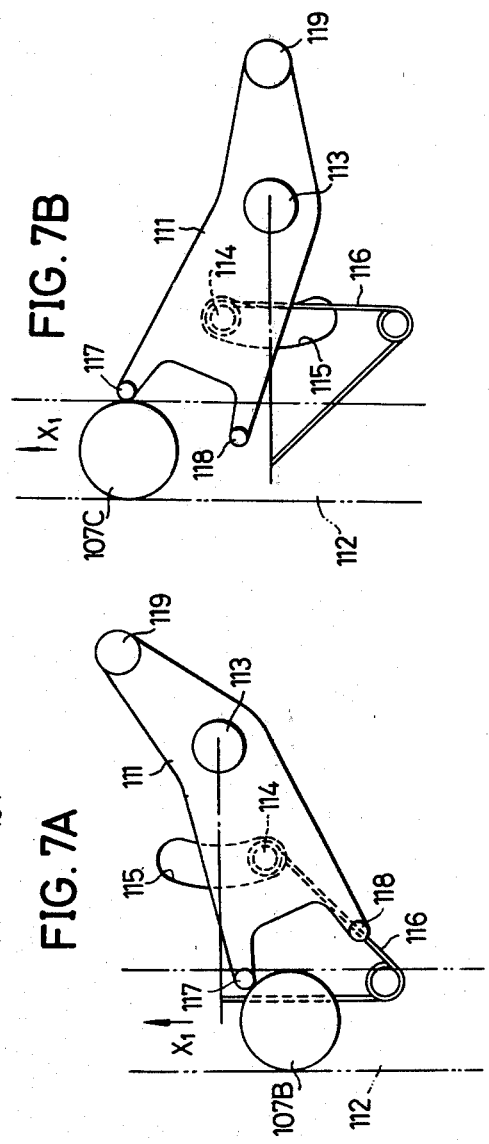

As indicated in FIGS. 7A and 7B, on large scale, the lock lever 111 is of a Y-shape structure and is provided to pivot about a pin 113. The lock lever 111 further has a pin 114 projecting downwards to fit into a slot 115 formed on a sub-chassis 120 which will be described below. A torsion spring 116 is provied, with one arm and another arm thereof respectively linked to the sub-chassis 120 and the pin 114. The lock lever 111 accordingly undergoes rotation to assume two positions indicated in FIGS. 7A and 7B and does not stop at an intermediate position therebetween. At each rotational position of the lock lever 111, either a pin 117 at the tip of one arm or another pin 118 on the other arm of the lock lever 111 enters into the pin member moving path 112. The lock lever 111 has a lock pin 119 at a leg part thereof. Before the disc case is inserted, the lock lever 111 assumes the position rotated counterclockwise, and the pin 117 is within the path 112, as indicated in FIG. 7A. As the disc case 10 is inserted, this pin 117 pushed or kicked by the pin member 107 moving in the direction of the arrow X1, to forcibly rotate the lock lever 111 to assume the rotational position indicated in FIG. 7B. By this rotation of the lock lever 111, the lifter elevator level 99 is engaged at a bent lug 99b thereof by the lock pin 119, and is accordingly locked at the position rotated clockwise. The pin 117 retreats from the path 112 and the pin 118 enters within the path 112.

With this construction of locking the lifter elevating lever 99 at the rotated position thereof, it is not necessary for the lifter elevating lever to extend over the whole length of the disc case insertion passage, and is sufficient only to confront a part of this passage. Therefore, the length of the lifter elevating lever can be shortened. Hence, the size of the disc lifter elevator mechanism 81 can be reduced accordingly, thus allowing the lifter elevator mechanism 81 to be provided on the sub-chassis 120 in a form of a sub-assembly mechanism. This affords advantageous features in that much improvement in the assembling operation of the reproducing apparatus 50, is ensured.

Referring back to FIG. 2, when the disc case 10 is inserted into the innermost part of the reproducing apparatus 50 together with the enlarging mechanism 51, through the upper side of the turntable 52, ride-over parts 22 of the lid plate 12 enter between the holding parts which are provided at positions mutually opposite to the holding fingers 70 and 71, and pass through these holding parts by pushing and spreading these parts. The holding fingers 70 and 71 close, as will be described hereinafter, after the ride-over parts 22 of the lid plate 12 have passed through, and the holding parts accordingly clamp a groove guard 15a of the disc 15.

Accompanied by the insertion of the disc case 10, locking fingers 130 and 130A relatively enter inside L-shaped cutouts 23 of the lid plate 12, and the rim portion 17 accordingly pushes contact fingers 131 and 131A. When the contact fingers 131 and 131A are pushed by the lid plate 12, main levers 132 and 132A respectively rotate to be latched. Furthermore, the locking fingers 130 and 130A rotate in directions so as to mutually separate from each other, and L-shaped parts 133 and 133A provided at the tip ends of the above locking fingers 130 and 130A respectively enter into the innermost parts of the cutouts 23, to lock the lid plate 12. The lid plate 12 is limited of its movement in the direction of the arrow X1 by the contact fingers 131 and 131A, and the lid plate 12 is thus locked and supported at the innermost part of the reproducing apparatus 50 in a state in which the lid plate 12 is placed and supported on supporting fingers 134 and 134A.

Furthermore, engagement releasing members 135 and 135A enter inside the openings on the right and left sides of the disc case 10, and push sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11.

When the main levers 132 and 132A rotate to positions where they are latched, leaf springs 136 and 136A respectively provided at the bent parts of the main levers push against a vertically extending part 70b of the upper holding finger 70. Hence, a rotational force in the direction of an arrow C is applied to the holding finger 70. Thus, the disc 15 is held at a predetermined height by the lower holding finger 71 and the uppoer holding finger 70.

Accordingly, when the disc case 10 is inserted into the final position, the engagement of the lid plate 12 with respect to the jacket 11 is released, and the disc 15 thus becomes locked by the locking fingers 120 and 120A, and held by the holding fingers 70 and 71.

Next, the jacket 11 is pulled out in the direction of the arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11.

Accompanied by the movement of the jacket 11 in the direction of the arrow X2, the jacket opening enlarging mechanism 51 also moves together with the jacket in the direction of the arrow X2.

When the jacket 11 is pulled out halfway, the pin member 107 moving in the direction of the arrow X2 pushes the pin 118 aside to rotate the lock lever 111 counterclockwise to positively assume the position indicated in FIG. 7A. The lifter elevating lever 99 is accordingly released from locked state, and rotates counterclockwise by due to the force exerted by the spring 100. Accompanied by rotation of the lever 99, the wire 95 is pulled, and the disc lifter 82 again moves up to the disc supportable position, to support the center part of the disc 15. The elevator motor 84 still remains stopped in this state. In this state, the disc 15 is supported horizontally at a position above the turntable 52, by the holding fingers 70 and 71 and the disc lifter 82. When the jacket 11 is further pulled out, the disc 15 completely separates from the jacket 11, the jacket opening enlarging mechanism 15 returns to its original position, and the jacket opening enlarging fingers 63 rotate in directions so as to mutually close upon each other and separate from the engaging windows 21. The jacket 11 returns to its original state due to its flexibility, and the enlarged opening also returns to the original state, and the jacket 11 is completely pulled out from the reproducing apparatus 50.

Figure 4:
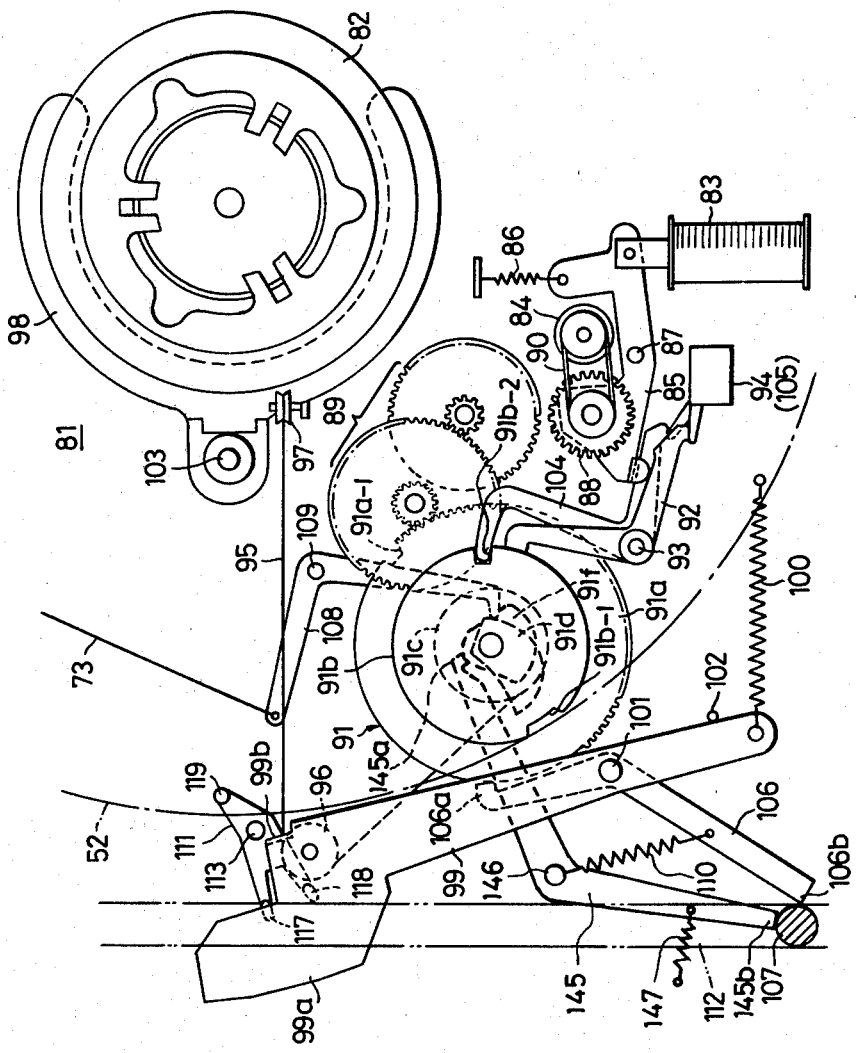
Figure 5:
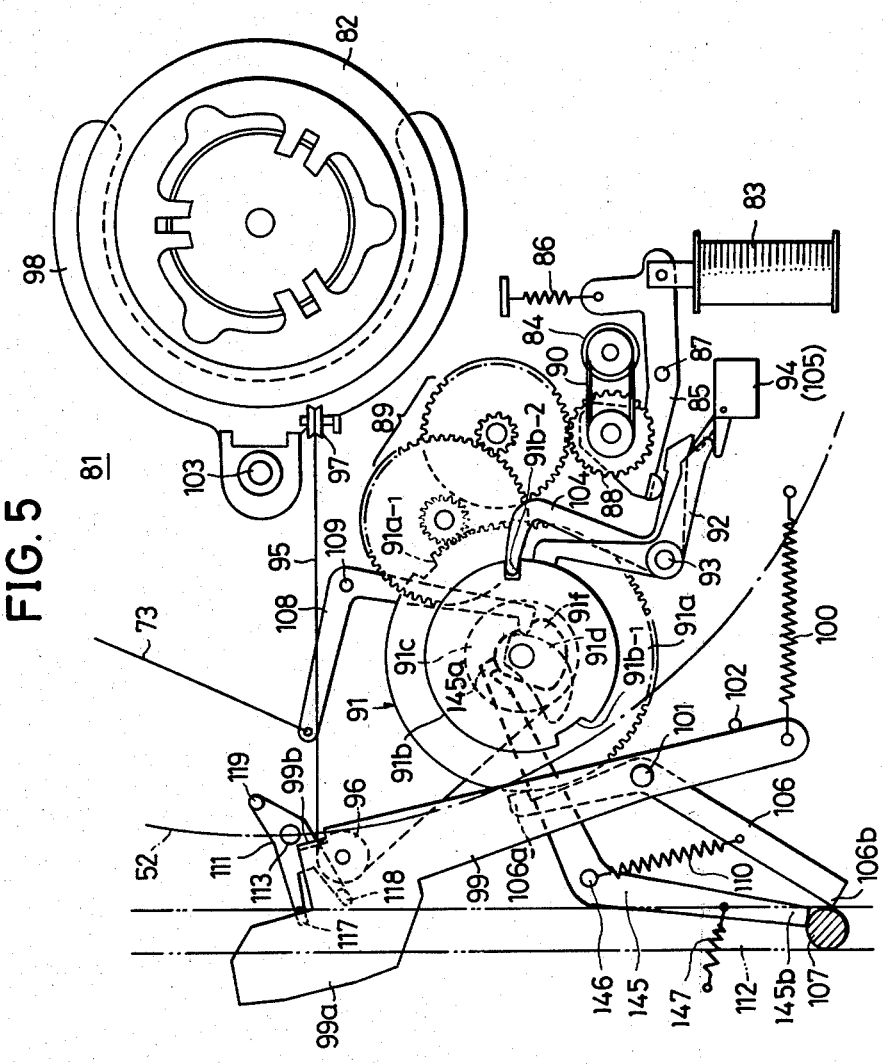

Whereupon the slider 60 returns into the original position, the pin member 107 pushes aside the end part 106b of the lefter lock lever 106, which thereby rotates to assume the original state indicated in FIGS. 4 and 5, where the beak 106a slips out from the depression 91a-1. The cam-gear structure 91 is accordingly released from the locked state by the lever 106.

Then, a play button 137 is pushed. Responsive to this operation, the elevator motor 84 begins to rotate in a reverse direction, and the cam-gear structure 91 rotates clockwise from the position indicated in FIG. 6 up to the original position indicated in FIG. 5, where the cam-gear structure 91 is locked by a beak part at the tip of the rotatable arm 104 entered into the depression 91b-2. The rotatable arms 92 and 104 now assume the state indicated in FIG. 5, and the microswitch 94 and 105 are changed over. Hence, the motor 84 stops and the plunger 83 is deenergized. As a result of the rotation of the cam-gear structure 91, the control arm 108 rotates clockwise to slacken the wire 73. Accordingly, the holding finger 71 rotates in a direction opposite to the direction of an arrow B, to release the clamping with respect to the disc 15. As another result of the rotation of the cam-gear structure 91, the wire 95 is pulled out from the reel 91c, and the disc lifter 82 moves downwards. Accordingly, the disc 15 moves down and is placed on the turntable 52.

Furthermore, a motor 140 starts to rotate a wire belt 142 to travel by way of worm gear 141. Accordingly, the pickup frame 65 moves in the direction of the arrow X1 from the waiting position. Furthermore, the turntable 52 is rotated by a motor 143. Thus, the disc 15 is relatively scanned by the reproducing stylus 66, to reproduce the information signal.

Next, an operation in which the disc 15 is recovered from within the reproducing apparatus 50, will now be described.

When the load-eject button 80 is pushed during the reproducing mode of operation, the motor 143 stops to stop the rotation of the disc 15, and the motor 140 rotates in a reverse direction to return the pickup frame 65 into the waiting position. Further, the plunger 83 is energized and the elevator motor 84 starts. Hence, the disc elevator mechanism 81 and the disc holding mechanism 53 operate, similarly as in the above described disc loading mode. That is, the disc 15 is clamped at the groove guard 15a by the disc holding mechanism 53, and is supported on the disc lifter 82 at the position above the turntable 52.

Upon recovering of the disc 15, the empty jacket 11 is inserted with its front end first into the reproducing apparatus 50 through the inserting opening 62. The jacket opening enlarging mechanism 51 is pushed by the jacket 11 and moves again in the direction of the arrow X1, to enlarge the opening of the jacket 11. Accompanied by the insertion of the jacket 11 in the direction of the arrow X1, the disc 15 is relatively inserted inside the jacket 11 through the opening of the jacket 11.

When the jacket 11 is inserted into the innermost position inside the reproducing apparatus 50, the disc 15 becomes completely incased within the jacket 11, and furthermore, the locked lid plate 12 is relatively inserted within the opening of the jacket 11.

When the jacket 11 is inserted into the final position, the disc 15 is accommodated within the jacket 11, and the main part of the lid plate 12 which has been locked, is inserted inside the jacket opening.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 50 to be recovered within the disc case 10.

Accompanied by the moving of the enlarging mechanism 51, the lifter elevating lever 99, the lifter lock lever 106, and the lock lever 111 operate, similarly as in the above described disc loading operation. After a certain period of time has elapsed, after the enlarging mechanism 51 has returned to the original position, the elevator motor 84 rotates in the reverse direction, and the disc lifter elevator mechanism 81 changes from the state indicated in FIG. 6 and assumes the state indicated in FIG. 5. Moreover, after the disc lifter 82 has completed the downward movement, the motor 84 stops and the plunger 83 is de-energized. The disc lifter elevator mechanism 84 now assumes the original state as indicated in FIG. 4.

The raising and lowering operation of the disc lifter 82 during the operation in which the disc case 10 or the empty jacket 11 is inserted and then pulled out of the reproducing apparatus 50 in order to load and recover the disc 15, is performed since the lifter elevator lever 99 rotates independently. Therefore, the raising and lowering operation of the disc lifter 82 is not affected by the speed with which the disc case 10 and the like is inserted and pulled out. Accordingly, the operation of the disc lifter 82 is performed with a predetermined timing determined by the position where the lifter elevator lever 99 is provided, according to the position of the disc case 10 inside the reproducing apparatus 50. Moreover, the control system can be simplified, since the elevator motor 84 remains stopped.

The operation in which the disc case 10 is inserted into the reproducing apparatus 50, is performed while rotating the lifter elevator lever 99 against the force exerted by the spring 100. Accordingly, by appropriately determining the force exerted by this spring 100, the disc case 10 can be inserted smoothly within the reproducing apparatus 50 by use of a small force.

In the above reproducing apparatus 50, if the disc lifter 82 lowers either during the disc loading operation or during the disc recovering operation, the disc 15 would not be supported at the normal position, and the disc loading and recovering operation cannot be performed in a normal manner. On the other hand, due to the characteristics of the above reproducing apparatus 50, there is a possibility that the disc lifter 82 may lower when supply of power to the reproducing apparatus 50 is cut off.

Next, description will be given on how the disc lifter 82 is maintained at the elevated position, even in a case where power supply to the reproducing apparatus is cut off during period in which the disc loading or recovering operation is performed.

In such cases where a plug 144 is pulled out from a power terminal, or where a power failure occurs, the power supplied to the reproducing apparatus 50 is cut off, and the plunger 83 is instantaneously de-energized. When the plunger 83 is de-energized, as indicated in FIG. 4, the lever 85 rotates counterclockwise by the force of the spring 86, and the gear 88 separates from the reduction gears 89. Hence, the load against the rotation of the cam-gear structure 91 is released. Accordingly, the cam-gear structure 91 tends to rotate by the weight of the disc lifter 82 in the clockwise direction, that is, in the direction of feeding out the wire 95 from the reel 91 to lower the disc lifter 82. However, when the disc loading or recovering operation is performed, the pin member 107 is at a position moved in the direction of arrow X1 from the original position indicated in FIGS. 2, 4, and 5. Therefore, the lifter lock lever 106 assumes the position rotated clockwise, and the beak 106a enters into the depression 91a-1, whereby the cam-gear structure 91 is locked. Accordingly, even though the plunger 83 is de-energized, the cam-gear structure 91 does not rotate and is maintained at the original position. Thus, the disc lifter 82 does not move downwards.

As a result, even when a power failure occurs during disc loading or recovering operation, the disc is normally loaded into the reproducing apparatus 50 and recovered into the disc case 10.

However, in a state where the empty jacket 11 is pulled out from the reproducing apparatus 50 and the disc 15 is supported by the disc lifter 82 which is in the raised position, the above described disadvantage introduced upon a power failure is not introduced even when the disc 15 is lowered. Further, the disc 15 may be deformed in a manner in which the free outer peripheral part of the disc 15 hangs down, when the disc 15 is maintained at the raised position for an extended period of time under a condition in which the temperature is high. Therefore, in the apparatus according to the present invention, the disc lifter 82 is constructed to move down automatically in a case where a power failure occurs in the above state where the disc 15 is supported by the disc lifter which is in the raised position.

That is, in a state where the empty jacket 11 is pulled out from the reproducing apparatus 50, the pin member 107 is returned to the original position. In addition, the lifter lock lever 106 is pushed by the pin member 107 and rotated as indicated by the two-dot chain line in FIG. 6, and the beak 106a slips out from the depression 91a-1. Accordingly, the cam-gear structure 91 is in a state where the locking action by the lock lever 106 with respect to the cam-gear structure 91 is released. Therefore, when the plunger 83 is de-energized, the gear 88 is separated from the reduction gear 89, and the load due to the elevator motor 84 applied with respect to the cam-gear structure 91 is released as in the above described case due to a power failure or a case where the plug 144 is pulled out from the power terminal, the cam-gear structure 91 rotates towards the clockwise direction due to the own weight of the disc lifter 82, that is, in a direction so as to feed out the wire 95 from the reel 91 to lower the disc lifter 82. Hence, the disc lifter 82 is lowered to a position where it is possible to perform reproduction, and the disc 15 is placed onto the turntable 52. As a result, the disc 15 is prevented from becoming deformed by being left in the raised position.

Generally, in the above type of a reproducing apparatus, there are cases where an attempt is made to load a disc 15 into the reproducing apparatus even when the supply of power is cut off. However, the above reproducing apparatus 50 is constructed so that the disc lifter 82 is lowered when the supply of power is cut off or the load/eject button 80 is not operated although the power is supplied. Therefore, when an attempt is made to load the disc 15 into the above reproducing apparatus 50 when the disc lifter 82 is in the lowered state, the disc 15 falls inside the reproducing apparatus 50 and cannot be recovered. Hence, the reproducing apparatus 50 according to the present invention is constructed so that the disc loading operation can be restricted in a case where the disc lifter 82 is in the lowered state.

A lever 145 is axially supported by a pin 146, and an end part 145a opposes a fan-shaped cam part 91f of the cam-gear structure 91. On the other hand, another end part 145b is positioned in the vicinity of the pin member 107 which is in the returned position, within the moving passage 112.

When the disc lifter is in the lowered state, the cam-gear structure 91 is at a rotational position shown in FIGS. 2, 4, and 5. Accordingly, a cam surface having a small diameter of the cam part 91f opposes the end part 145a of the lever 145. The lever 145 is rotated in the clockwise direction by a spring 147, and the end part 145b enters within the moving passage 112 to oppose the pin member 107.

The jacket opening enlarging mechanism 51 is in a state restricted of the movement towards the direction of the arrow X1, and the operation in which the disc case 10 is inserted into the reproducing apparatus 50 is restricted.

When the disc lifter 82 is raised, and the reproducing apparatus 50 is in a state where no problems are introduced by the loading of the disc 15, the cam-gear structure 91 is at a rotational position shown in FIG. 6. Hence, a cam surface having a large diameter of the cam part 91f, opposes the end part 145a of the lever 145. Accordingly, the lever 145 rotates in the counterclockwise direction against a force exerted by the spring 147, and the end part 145b retreats from the moving passage 112.

Therefore, the restriction of movement in the direction of the arrow X1 with respect to the above jacket opening enlarging mechanism 51 is released, and it becomes possible to perform the operation in which the disc case 10 is inserted into the reproducing apparatus 50.

The disc lifter 82 is also in the lowered state upon reproduction of the disc 15, and in this case, the end part 145b of the lever 145 enters within the moving passage 112 as in the above described case. Thus, the lever 145 prevents a so-called double insertion of the disc where the disc case 10 is inserted into the reproducing apparatus 50 during reproduction of the disc 15.

Figure 8:
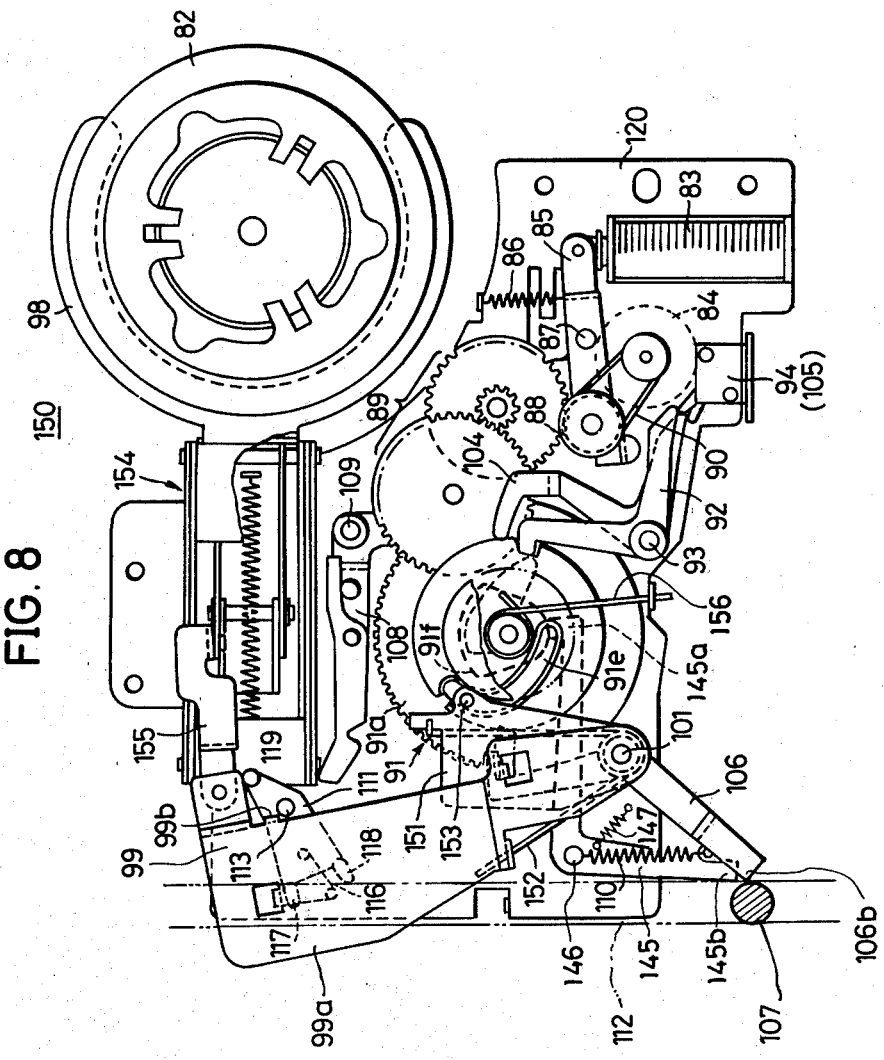
FIG. 8 is a plan view, partly cut away, showing another embodiment of a disc lifter elevator mechanism in a state after the disc lifter has been elevated.

Next another embodiment of the disc lifter elevator mechanism will be described with reference to FIG. 8. FIG. 8 shows a state corresponding to the state where the disc lifter 82 in an elevated state in the above described embodiment as indicated in FIG. 6. Parts in FIG. 8 which have the same function as corresponding to parts in FIG. 6 are designated by like reference numerals. Detailed description of such parts will not be repeated.

A disc lifter elevator mechanism 150 is substantially the same as the above described disc lifter elevator mechanism 81, except at the lifter elevating lever 99, the cam-gear structure 91, and the disc lifter elevating mechanism.

The lifter elevating lever 99 (having no arm part where the spring 100 is hooked), and a control lever 151 are supported in common to pivot about the pin 101. The lifter elevating lever 99 is urged to rotate counterclockwise with respect to the control lever 151 by a torsion spring 152. The control level 151 has a pin 153 at a free and thereof which is fitted into a cam groove 91e additionally formed on the cam-gear structure 91, and thus rotates counterclockwise responsive to the counterclockwise rotation of the cam-gear structure 91. A so-called pantograph mechanism 154 having a pair of arm members crossed to form a letter "X" (referring to FIG. 3) is provided for the elevator plate 98. The lifter elevating lever 99 and the pantograph mechanism 154 is connected by a link 155. As the cam-gear structure 91 rotates, the lifter elevating lever 99 undergoes rotation together with the control lever 151, and the pantograph mechanism 154 operates to move the elevator plate 98 upwards and downwards. When the disc case 10 is inserted into the reproducing apparatus 50, the lifter elevating lever 99 is pushed aside by the pin member 107 and rotates clockwise, independent of the control lever 151, against the torsion spring 152, and is locked by the lock lever 111. Furthermore, with the provision of the pantograph mechanism 154, the wire 95 and the reel 91c of the cam-gear structure 91 are omitted.

That is, the lowering and raising operation of the disc lifter 82 upon insertion and extraction of the disc case, is also performed without rotating the motor 84, by rotating the lifter elevator level 99. Further, by suitably selecting the spring force exerted by the torsion spring 152, the disc case 10 can be inserted into the reproducing apparatus 50 by use of a small force.

Moreover, in a case where the supply of power is cut off in a state where the disc 15 is supported by the disc lifter 82 which is in the raised position, the cam-gear structure 91 rotates in the counterclockwise direction due to a spring force exerted by a torsion spring 156. Accordingly, the control lever 151 and the lifter elevator lever 99 respectively rotate unitarily towards the clockwise direction, and the disc lifter is accordingly lowered.

In addition, the rotational position off the fan-shaped cam part 91f is controlled, so as to restrict the movement of the jacket opening enlarging mechanism 51 as in the above described case.

Further, this invention is not limited to the above described embodiments, but various variations and modifications may be made without departing from the scope of the present invention.

What is claimed is:

1. A rotary recording medium reproducing apparatus for reproducing a rotary recording medium accommodated within a case, said case comprising a jacket provided with a space for accommodating said rotary recording medium and an opening for allowing said rotary recording medium to go in and out of said jacket, and a lid member inserted through said opening of said jacket for closing said opening of said jacket, said rotary recording medium reproducing apparatus comprising:
   an inserting opening through which said case is inserted;
   a turntable for rotating said rotary recording medium;
   lid member locking means and rotary recording medium clamping means respectively provided at an innermost part of said reproducing apparatus opposite to said inserting opening with respect to said turntable;
   jacket opening enlarging means provided in the vicinity of said inserting opening, capable of moving over said turntable between a position in the vicinity of said inserting opening and said innermost part of said reproducing apparatus, in response to an operation in which said case is inserted into and pulled out from said reproducing apparatus;
   elevator means for raising and lowering a rotary recording medium supporting member for supporting said rotary recording medium, independently from said turntable;
   an elevator motor for operating said elevator means, said elevator motor operating so that said support member is at a raised position due to the operation of said elevator means upon insertion of said case into said reproducing apparatus; and
   an elevator lever member provided respective of said elevator means, for operating said elevator means by operating independently from said elevator motor,
   said elevator lever member being positioned within a moving passage of a locking guiding part which is a part of said jacket opening enlarging means, said elevator lever member being locked and guided by said locking guiding part and displaced towards a direction so as to operate said elevator means to lower said supporting member so that said supporting member retreats from a case inserting path upon insertion of said case into said reproducing apparatus, and being released of the locking operation by said locking guiding part and displaced towards an opposite direction so as to operate said elevator means to raise said supporting member upon extraction of said case from said reproducing apparatus.

2. A reproducing apparatus as claimed in claim 1 in which said rotary recording medium elevator means consists of an elevator member capable of supporting said supporting member and moving upwards and downwards, a wire having one end connected to said elevator member, and a reel member connected to the other end of said wire, said reel member being rotated towards a direction by said elevator motor so as to take-up said wire, and said elevator lever member has a pulley for guiding said wire, and provided in a manner rotatable independently from said reel member.

3. A reproducing apparatus as claimed in claim 1 in which said rotary recording medium elevator means consists of a cam body rotated by said elevator motor, a lever mechanism having first and second levers rotationally displaced according to the rotation of said cam body, and a pantograph mechanism connected to said lever mechanism for raising and lowering said supporting member according to the rotational displacement of said lever mechanism, said elevator lever member is connected to said pantograph mechanism of said lever mechanism, and said elevator lever member is a first lever member connected to a second lever member making contact with said cam body by way of a spring member and is capable of being rotationally displaced independently from said second lever member.

4. A reproducing apparatus as claimed in claim 1 which further comprises a plunger energized by an operation preceding the operation in which said case is inserted into said reproducing apparatus to connect an output shaft of said elevator motor to said elevator means, and de-energized upon a power failure and the like to separate said output shaft of said elevator motor from said elevator means, and a locking mechanism for locking said elevator means when said case is inserted into said reproducing apparatus and for releasing the locking operation with respect to said elevator means when said case is pulled out from said reproducing apparatus, said elevator means operating in response to the de-energization of said plunger in a state where the locking operation by said locking mechanism with respect to said elevator means is released, to operate and lower said supporting member.

5. A reproducing apparatus as claimed in claim 4 which further comprises a spring member for urging said elevator means towards a direction so as to lower said supporting member.

6. A reproducing apparatus as claimed in claim 1 which further comprises movement controlling means operated in response to the operation of said elevator means, for restricting movement of said jacket opening enlarging means towards said innermost part of said reproducing apparatus when said supporting member is in a lowered state, and for releasing the movement restricting operation with respect to said jacket opening enlarging means when said supporting member is in a raised state.

* * * * *